(12) United States Patent
Schneider et al.

(10) Patent No.: US 11,031,714 B2
(45) Date of Patent: Jun. 8, 2021

(54) ARRANGEMENT AND VALVE

(71) Applicant: Robert Bosch GmbH, Stuttgart (DE)

(72) Inventors: Claus Schneider, Burgsinn (DE);
Reiner Vaethjunker, Partenstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/423,353

(22) Filed: May 28, 2019

(65) Prior Publication Data
US 2019/0372259 A1 Dec. 5, 2019

(30) Foreign Application Priority Data
May 30, 2018 (DE) ...................... 10 2018 208 608.7

(51) Int. Cl.
*H01R 13/11* (2006.01)
*F16K 31/06* (2006.01)
*H01R 13/04* (2006.01)

(52) U.S. Cl.
CPC ........ *H01R 13/113* (2013.01); *F16K 31/0675* (2013.01); *H01R 13/04* (2013.01)

(58) Field of Classification Search
CPC ...... H01R 13/04; H01R 12/58; H01R 13/112; H01R 13/02; H01R 13/11; H01R 13/113; H01R 13/114; H01R 13/18; H01R 13/432; F15B 13/0889; F16K 27/048; F16K 31/06; F16K 31/0675; F16K 31/0679; F16K 31/04; F16K 31/046; F16K 31/02
See application file for complete search history.

(56) References Cited

U.S. PATENT DOCUMENTS

| | | | | |
|---|---|---|---|---|
| 5,179,343 A * | 1/1993 | Chishima | ............... | G01R 31/69 324/538 |
| 5,340,331 A * | 8/1994 | Bohlen | ................... | H01R 31/02 439/502 |
| 5,588,465 A * | 12/1996 | Witowski | ............ | F15B 13/0402 137/596.16 |
| 5,758,931 A * | 6/1998 | Hio | ..................... | B60R 16/0238 303/113.1 |
| 5,806,565 A * | 9/1998 | Kadlicko | ............ | F15B 13/0402 137/625.63 |
| 5,938,486 A * | 8/1999 | Durand-Cochet | ... | H01R 13/432 439/745 |
| 6,089,880 A * | 7/2000 | Miyagawa | ............. | H01R 13/11 439/741 |
| 6,164,335 A * | 12/2000 | Hayashi | ............. | F15B 13/0817 137/884 |
| 6,170,527 B1 * | 1/2001 | Hayashi | ............. | F15B 13/0817 137/269 |
| 6,511,336 B1 * | 1/2003 | Turek | .................. | H01R 13/113 439/246 |

(Continued)

FOREIGN PATENT DOCUMENTS

DE 3830188 A1 * 3/1990 ........... H01R 13/415

Primary Examiner — Edwin A. Leon
Assistant Examiner — Matthew T Dzierzynski
(74) Attorney, Agent, or Firm — Maginot, Moore & Beck LLP

(57) ABSTRACT

An arrangement for a valve, for example a hydraulic valve, has at least one magnet coil and at least one electric contact. The at least one magnet coil is configured to be contacted electrically by way of the at least one electric contact. The at least one electric contact is configured to be contacted by way of a blade receptacle.

18 Claims, 4 Drawing Sheets

(56) References Cited

U.S. PATENT DOCUMENTS

| | | | | |
|---|---|---|---|---|
| 6,520,202 | B2* | 2/2003 | Miyazoe | F15B 13/0402 |
| | | | | 137/554 |
| 6,591,865 | B2* | 7/2003 | Misumi | F15B 13/0402 |
| | | | | 137/554 |
| 6,990,999 | B2* | 1/2006 | Patel | F15B 13/0814 |
| | | | | 137/596.16 |
| 7,070,161 | B2* | 7/2006 | Piehl | F15B 13/044 |
| | | | | 137/554 |
| 7,189,101 | B2* | 3/2007 | Nagashima | H01R 13/6315 |
| | | | | 439/374 |
| 7,396,264 | B2* | 7/2008 | Cheng | H01R 11/05 |
| | | | | 439/857 |
| 8,534,641 | B2* | 9/2013 | Schalowski | H01R 12/58 |
| | | | | 251/129.15 |
| 9,184,524 | B2* | 11/2015 | Tomita | H01F 7/16 |
| 9,343,853 | B2* | 5/2016 | Okada | H01R 13/73 |
| 10,167,962 | B2* | 1/2019 | Itoh | F16K 31/426 |

* cited by examiner

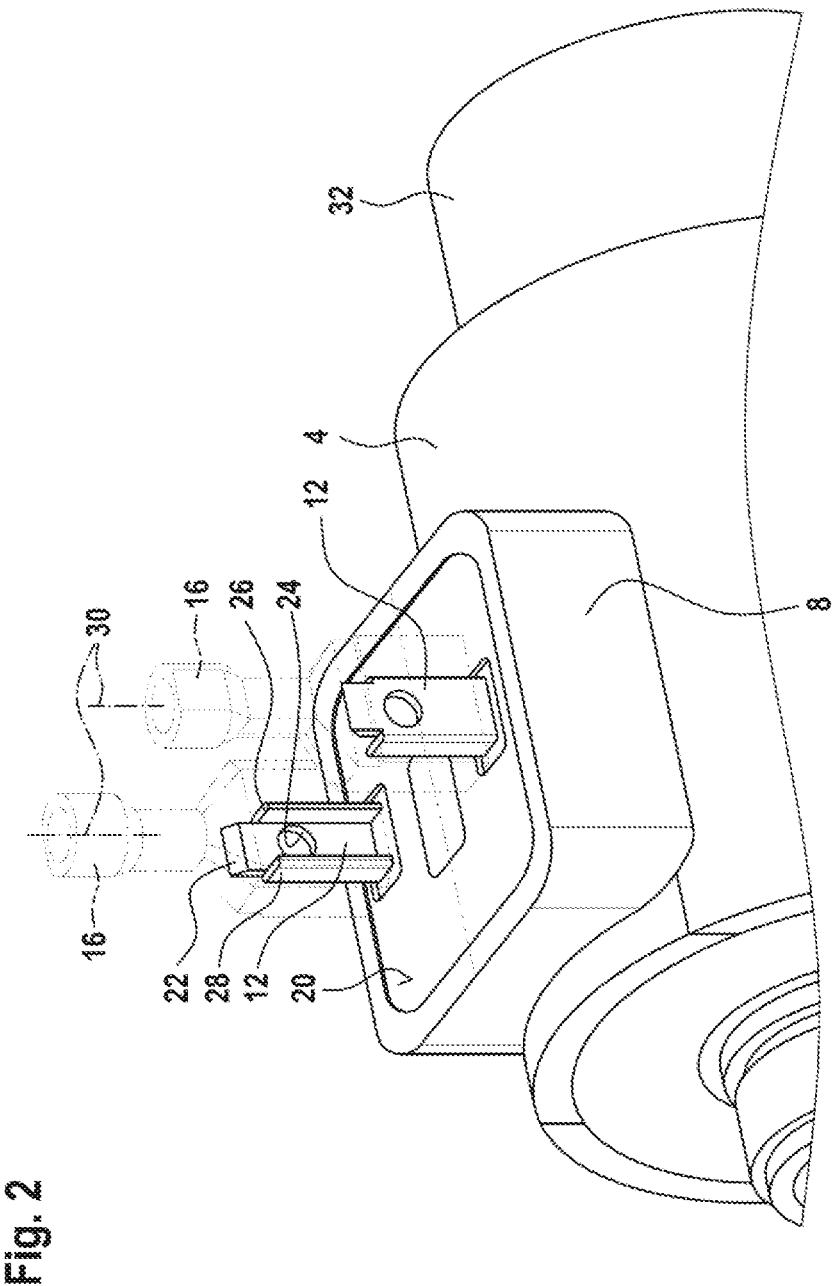

ARRANGEMENT AND VALVE

This application claims priority under 35 U.S.C. § 119 to patent application number DE 10 2018 208 608.7, filed on May 30, 2019 in Germany, the disclosure of which is incorporated herein by reference in its entirety.

BACKGROUND

The disclosure relates to an arrangement and to a valve.

Direct-controlled directional valves are known from the prior art, which are valves, the control pistons of which are actuated by way of magnets, pneumatic or hydraulic cylinders or by way of a mechanically acting apparatus. In the case of solenoid-controlled directional valves, magnet coils are provided which are contacted electrically, in order to actuate the valve. In installation situations, in which a connector plug for the magnet coils is covered by a housing of the valve or a housing section of the valve, the magnet coils are currently usually contacted with cuboid cubic plugs and fixed with a locking screw on account of safety and fatigue strength. A customary configuration of a cubic plug of this type for a hydraulic directional valve is shown in the European standard EN 175301-103, August 2016.

SUMMARY

In contrast, the disclosure is based on the object of providing an arrangement for a valve, by way of which the valve can be configured in an inexpensive and space-saving manner. Furthermore, it is an object of the disclosure to provide an inexpensive and space-saving valve.

The object is achieved with regard to an arrangement in accordance with the features described herein and with regard to a valve in accordance with the features described herein.

Advantageous developments of the disclosure are the subject matter of the following description.

According to the disclosure, an arrangement for a hydraulic valve is provided, which arrangement has at least one magnet coil for magnetically actuating a valve slide of the valve. To this end, at least one electric contact can be provided, by way of which the magnet coil can be contacted or can be loaded with electric voltage, as a result of which the valve can be switchable and/or steplessly adjustable. The at least one electric contact is advantageously contacted with a blade receptacle. The contact is preferably connected to the magnet coil. It has been shown surprisingly that a blade receptacle of this type for contacting the contact of the magnet coil is completely sufficient with regard to safety and fatigue strength in the area of application of hydraulic valves. Therefore, for example, the customary cubic plugs which are expensive and complex in terms of device technology can be dispensed with.

In other words, this solution has the advantage that inexpensive, robust and space-saving contacting of the valve can be made possible, since large, screwed-on cubic plugs as in the prior art can be dispensed with in favor of the blade receptacle requiring smaller installation spaces or a plurality of blade receptacles. Therefore, a particularly simple way in terms of device technology for contacting the valve is made possible.

The blade receptacle can preferably be of standardized configuration, for example in accordance with the German industry standard DIN 46245, sheet 3, March 1975. Since they are standard norm parts, they can be manufactured or purchased particularly inexpensively in high quantities. Therefore, the contacting of the valve can be achieved in a particularly inexpensive way. Here, it can advantageously be of packaged and/or fully insulated configuration. It can have contacting means, for example a small contact plate, by way of which the blade receptacle can contact an electric contact. The small contact plate can have an (in particular, approximately) rectangular, small plate-shaped section. This can be adjoined on one of the longer sides by at least one or preferably two (in particular, curved) cheek sections/sections which can, for example, engage around the contact. The respective cheek section can project away from the rectangular section of the small contact plate (in particular, approximately) at a 90° angle, and can then be curved in a U-shaped manner toward a center of the blade receptacle. In other words, the cheek sections can be of frame-shaped configuration in cross section. As a result, the contact to be contacted by way of the blade receptacle can be pressed, for example, by way of the cheek sections onto the plate-shaped section of the small contact plate, as a result of which contacting can be made possible. On a side which faces away from the through opening, the blade receptacle can be connected to and/or contacted with a cable or a wire.

Furthermore, the blade receptacle can have means or holding means on the inner side, for example at least one projection. The latter can be configured, for example, as part of a housing or the insulation of the blade receptacle. With elastic deformation during the contacting, it can engage into an opening and/or recess provided for this purpose on the contact. As a result, disconnecting, in particular unintended disconnecting, or detaching of the blade receptacle can advantageously be avoided during the operation of the valve. The projection can be configured, for example, as a spring element or as a barb. A plug-in connection of this type is advantageously of vibration-resistant configuration. Therefore, safety and fatigue strength of the contacts in the area of application of hydraulic valves can be ensured.

The at least one contact can be preferably be of standardized configuration in accordance with the German industry standard DIN IEC 60760. It is possible that a plurality of contacts are provided in one plug-in connector. The latter can then be configured, for example, in accordance with EN 175301-803:2006, page 10. It can preferably project out of a housing, for example a housing for the magnet coil. Here, it can have a thickness, for example, of (in particular, approximately) 0.8 mm. The contact can advantageously be of flat and/or pin-shaped configuration. The contact can particularly preferably have a U-shaped profile. It can therefore have, for example, a connecting section and two (for example, bent-over) limbs or cheek sections. As a result, a plug-in connection of the contact can preferably be fixed to the blade receptacle in one plane, for example perpendicularly with respect to the contact. The connecting section can thus fix the plug-in connection, for example, in one spatial direction in the plane. The bent-over limbs can then fix the plug-in connection in a further spatial direction. In other words, a clamping-in action in two axial directions can be take place by way of the U-shaped contacts which are enclosed by the blade receptacle, as a result of which a particularly intimate contact of the blade receptacle with the contact is made possible. The contact can preferably have at least one cut-out or through-opening, into which the projection of the blade receptacle can then engage, in order to ensure a secure plug-in connection in a third spatial direction, perpendicularly with respect to the plane of the first two spatial directions. In other words, an anti-disconnecting protective means can project to the inside on the blade receptacle, which anti-disconnecting protective means can be configured as a barb or spring which counteracts disconnecting. As a result, the locking screw (as is known in the prior art) can advantageously be dispensed with, as a result of which an embodiment of the plug-in connection which saves installation space is made possible. As a result, the valve which can be contacted by way of the plug-in connection can also advantageously be configured in a manner which saves installation space. Since the contact is a standard norm part, it can additionally be manufactured or purchased particularly inexpensively in high quantities.

The magnet coil can preferably have two or more electric contacts which can be then be contacted in each case with a blade receptacle.

According to the disclosure, furthermore, a hydraulic valve is provided which is contacted via at least one arrangement in accordance with one or more of the abovementioned aspects. The valve can have a magnet coil or preferably two magnet coils which in each case can actuate the valve. Therefore, the valve can be configured, for example, as a direct-controlled directional spool valve, the control piston of which can be actuated directly by way of a magnetically acting apparatus, such as the magnet coil. The valve can advantageously be contacted in a manner which saves installation space by way of the arrangement and can be of inexpensive configuration.

BRIEF DESCRIPTION OF THE DRAWINGS

One preferred exemplary embodiment of the disclosure will be described in greater detail in the following text using diagrammatic drawings, in which:

FIG. 2 shows a perspective view of contacting of a contact of the valve with a blade receptacle, FIG. 4b shows a plan view of the contacts from FIG. 4a.

DETAILED DESCRIPTION

Figure 1:
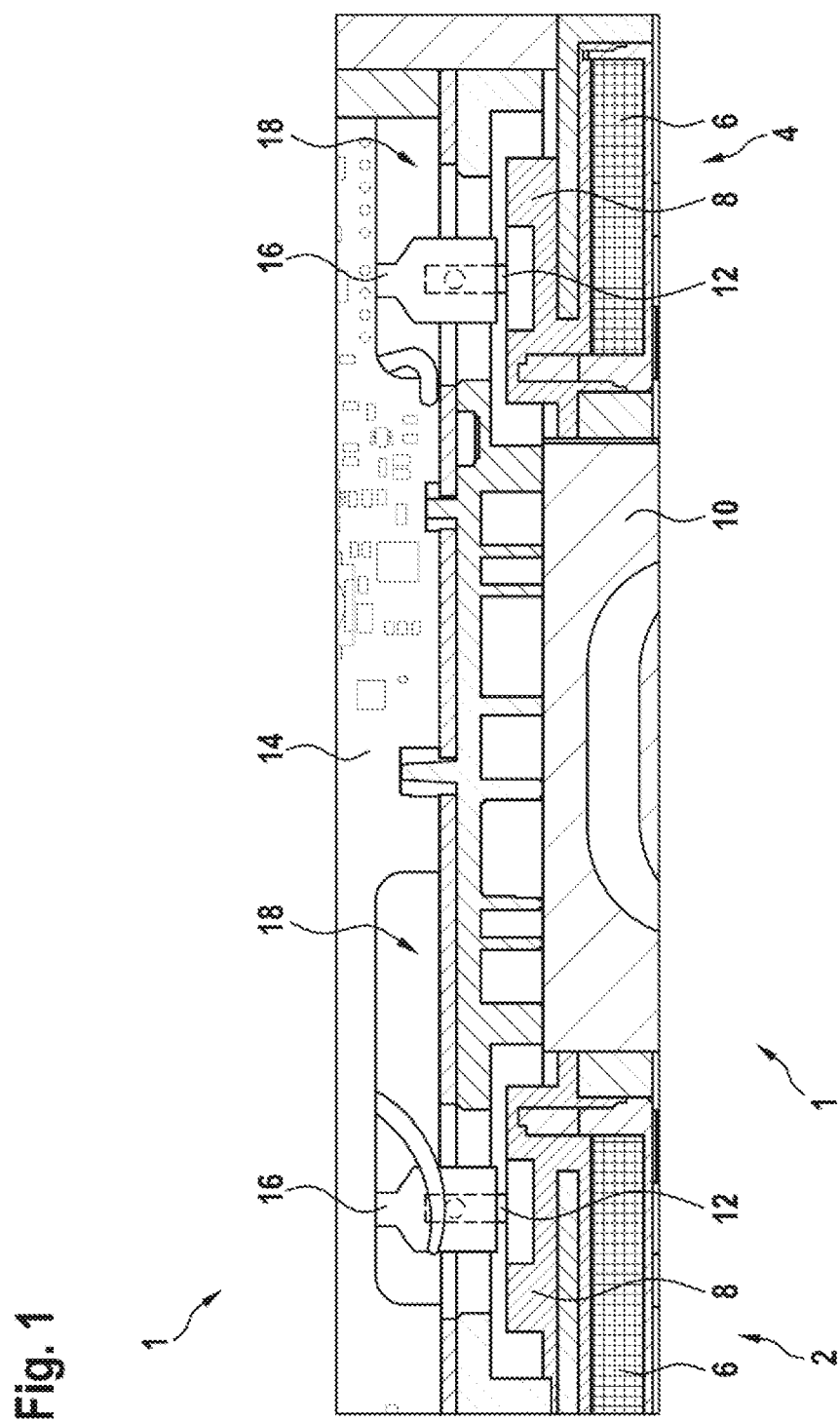
FIG. 1 shows a longitudinal section of a part of a valve having an arrangement according to the disclosure.

FIG. 1 shows a detail of a valve 1. Said valve 1 has two approximately circular-cylindrical, outer actuator housings 2 and 4, in which in each case one hollow circular-cylindrical magnet coil 6 is arranged, of which in each case only a part is visible. A valve slide (not shown) of the valve 1 can be switched or can be steples sly adjusted by way of the magnet coils 6. The magnet coils 6 are enclosed in each case by a housing section 8. An arrangement having the valve slide (not shown) of the valve 1 is provided in a cuboid valve housing 10 of the valve 1, which valve housing 10 is arranged between the actuator housings 2 and 4. The magnet coils 6 can be contacted with a printed circuit board 14 via flat contacts 12. To this end, each actuator housing 2, 4 with a magnet coil 6 has at least two contacts 12. In each case one contact 12 is then contacted electrically with the printed circuit board 14 via a respective blade receptacle 16. The printed circuit board 14 is arranged spaced apart from the actuator housings 2, 4 and the valve housing 10. In the region of the contacts 12, it has recesses 18, in which the plug-in connections which in each case have the contacts 12 and the blade receptacles 16 are arranged.

In accordance with FIG. 2, the section 4 of the valve 1 (see FIG. 1) is shown in sections. The housing section 8 which is configured as a part of the circular-cylindrical section 4 can be seen. The housing section 8 has a planar surface 20 which is arranged at a parallel spacing from a tangential plane of the actuator housing 4. The two contacts 12 project from the surface 20. In each case one blade receptacle 16 engages around a respective contact 12, as a result of which the magnet coil 6 (see FIG. 1) is contacted. The contacts 12 in each case have a connecting section 22 (provided with a reference numeral only on one contact 12). Said connecting section 22 has a through-opening 24, through which the blade receptacle 16 can be held via means on the contact 12. The contact 12 has a first and a second side section 26, 28 which lie in each case perpendicularly on the connecting section 22. The side sections 26 and 28 and the connecting section 22 are arranged in a U-shaped manner. Here, as viewed from the surface 20 of the housing section 8, the connecting section 22 is longer than the two side sections 26 and 28. The connecting section 22 tapers on its side which faces away from the housing section 8, in order to make facilitated plugging on of the blade receptacle 16 possible. A respective blade receptacle 16 can be contacted via a cable 30 (shown by way of a dashed line). An emergency actuation switch 32 is provided at a front-side end of the cylindrical section 4, which end points away from the section 10 (see FIG. 1).

Figure 3A:
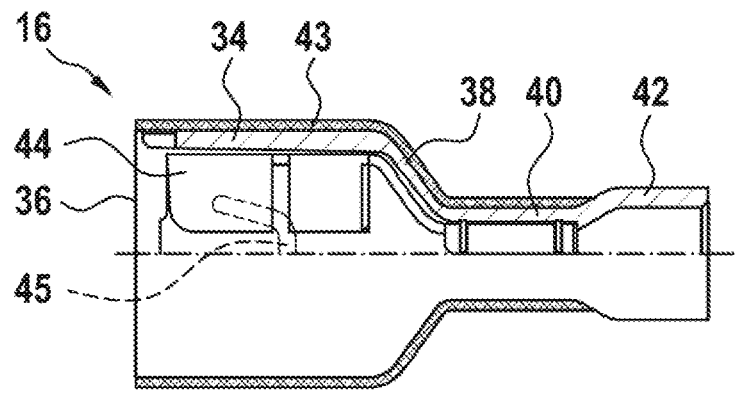
FIG. 3a shows a half section through a blade receptacle for the arrangement according to the disclosure.

The blade receptacle 16 is shown in detail in accordance with FIG. 3a. It has a sleeve section 34 which is of approximately rectangular configuration as viewed from an end side 36 of the blade receptacle 16. Said sleeve section 34 engages around the contact 12 (see FIG. 1). The housing section 34 is adjoined by a hollow frustum-shaped section 38 which tapers in the direction away from the end side 36. This is in turn adjoined by a crimping section 40 which is adjoined by a slightly widened insulating section 42. An insulating shell 43 engages around the sleeve section 34, the frustum-shaped section 38 and the crimping section 40. Contacting means 44 are provided in the blade receptacle 16, by way of which the contact 12 (see FIG. 1) can be contacted. A contact 12 (see FIG. 1) can be fixed in the blade receptacle 16 via means, in particular holding means 45, for example a latching lug. The holding means 45 engages into the through-opening 24 (see FIG. 2) of the contact 12 and is fixed there.

Figure 3B:
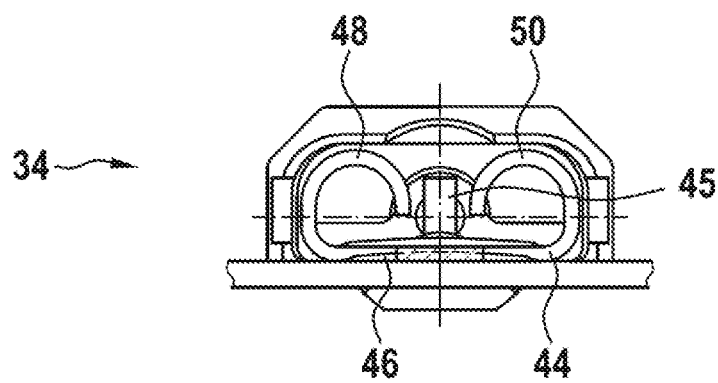
FIG. 3b shows a cross section through the blade receptacle from FIG. 3a, FIG. 3c shows a longitudinal section through the blade receptacle from FIG. 3a, FIG. 4a perspectively shows a plurality of contacts for the arrangement according to the disclosure.

FIG. 3b shows a cross section through the housing section 34 of the blade receptacle 16 from FIG. 3a. The contacting means 34 can be seen. It is configured as a small plate 46 with bent-over cheek sections 48 and 50. The cheek sections 48 and 50 extend approximately perpendicularly from the small plate 46, and are subsequently bent into the interior of the blade receptacle 16. In other words, they are of approximately frame-shaped configuration.

Figure 3C:
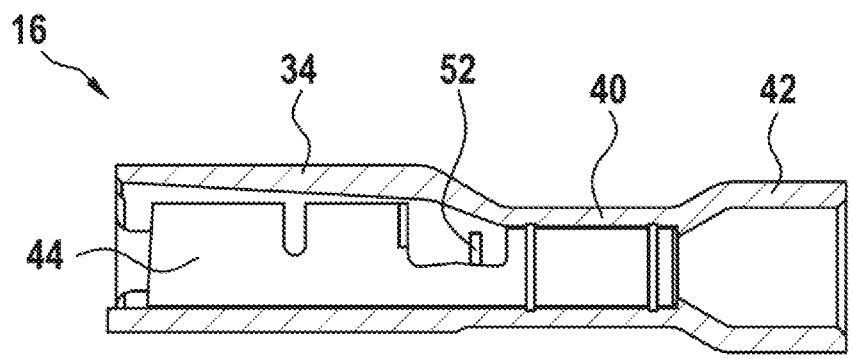

FIG. 3c shows a longitudinal section through the blade receptacle 16 with the housing section 34, the frustum-shaped section 38, the contacting means 40 and the insulating section 42. The contacting means 44 is arranged in the housing section 34. A stop 52 is provided in the frustum-shaped section 38, which stop 52 positions an introduced cable (not shown) and limits an insertion depth of the cable.

Figure 4A:
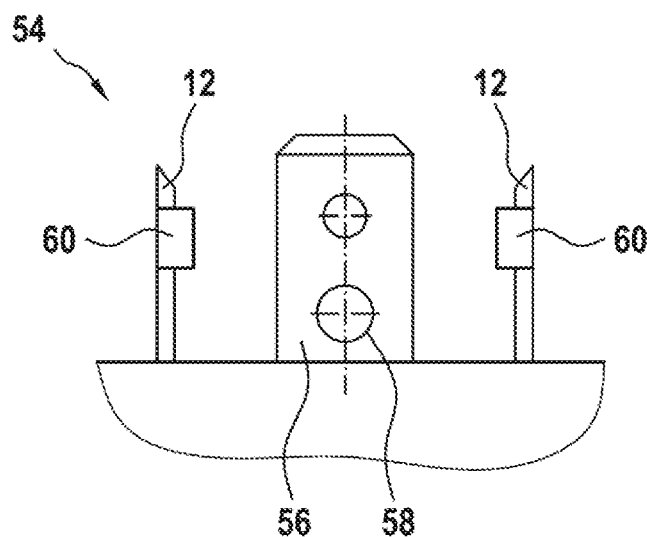

In accordance with FIG. 4a, a plug-in connector 54 (as is provided, for example, on the housing section 8 (see FIG. 1) is shown with three contacts 12 (of which only two are visible in FIG. 4a) and a ground conductor 56. The contacts 12 are arranged with the ground conductor 56 approximately on a pitch circle and project approximately perpendicularly from a surface of the plug-in connector 54. They are of plate-shaped configuration. A blade receptacle 16 (see FIG. 1) can be fixed on the plug-in connector 54 in a positively locking manner via through-openings 58 (provided by way of example with a reference numeral only on the ground conductor 56). Laterally on each of their longitudinal edges, the contacts 12 in each case have a cheek section 60 which is arranged perpendicularly with respect to a large side of the contact 12 and points in each case toward the opposite contact 12. As a result of the cheek sections 60, the contact has a U-shape in cross section.

Figure 4B:
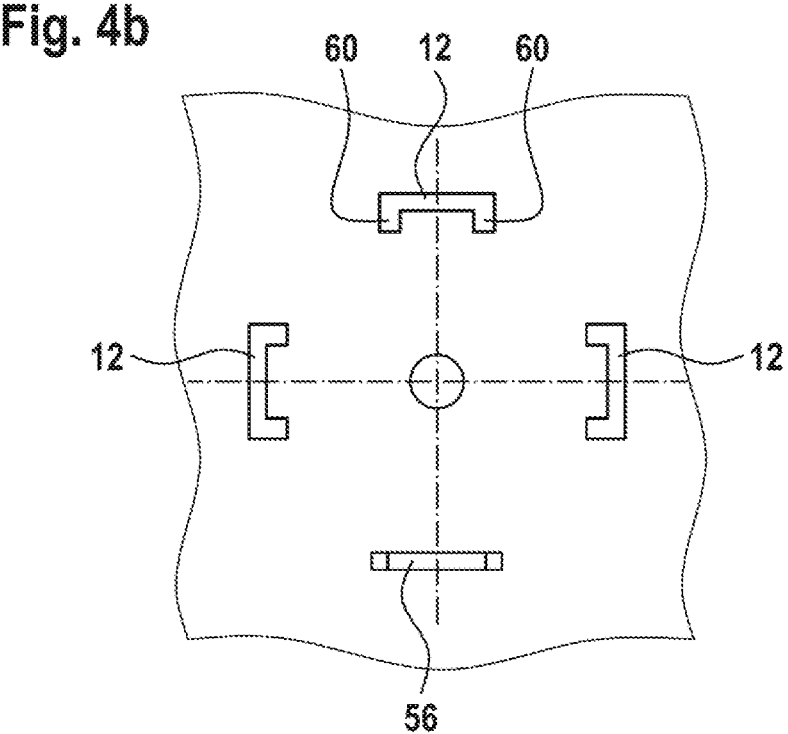

FIG. 4b shows the plug-in connector 54 from FIG. 4a in plan view. The three contacts 12 with the in each case two cheek sections 60 (provided by way of example with a reference numeral only on one contact 12) and the ground conductor 56 are shown. Two of the contacts 12 lie opposite one another, whereas the third contact 12 is arranged opposite the ground conductor 56.

An arrangement for a valve is disclosed having at least one magnet coil and having at least one electric contact, by way of which the magnet coil can be contacted electrically, the contact being contacted by way of a blade receptacle.

What is claimed is:

1. An arrangement for a hydraulic valve, comprising:
   at least one magnet coil arranged in an actuator housing;
   at least one male electric contact configured to electrically contact the at least one magnet coil, the at least one electric contact defining a receiving feature;
   a female blade receptacle having opposed first and second ends and being configured to electrically contact the at least one electric contact at the first end;
   a holding mechanism disposed on an inner side of the blade receptacle, the holding mechanism configured to engage into the receiving feature so as to fix the blade receptacle on the at least one electric contact in a first spatial direction; and
   a housing component arranged spaced apart from the actuator housing, the at least one electric contact, and the blade receptacle and positioned so as to cover the at least one electric contact and the blade receptacle in the first spatial direction, the blade receptacle electrically connected to the housing component at the second end.

2. The arrangement according to claim 1, wherein the blade receptacle is configured in accordance with DIN 46245.

3. The arrangement according to claim 1, wherein the blade receptacle has at least one section configured to engage around the at least one electric contact.

4. The arrangement according to claim 1, wherein the at least one electric contact is configured in accordance with DIN IEC 60760.

5. The arrangement according to claim 1, wherein the at least one electric contact projects out of the actuator housing.

6. The arrangement according to claim 1, wherein the at least one electric contact has a flat configuration.

7. The arrangement according to claim 6, wherein the at least one electric contact has a U-shaped profile.

8. The arrangement according to claim 1, wherein:
   the blade receptacle is a first blade receptacle,
   the arrangement includes a second blade receptacle, and
   the at least one magnet coil has at least two electric contacts which are contacted with, in each case, one blade receptacle of the first and the second blade receptacles.

9. The arrangement according to claim 1, wherein the receiving feature is a through-opening or a recess defined by the at least one electric contact.

10. The arrangement according to claim 9, wherein the holding mechanism is a projection that extends into the through-opening or the recess.

11. The arrangement according to claim 10, wherein the projection extends entirely through the through-opening.

12. The arrangement according to claim 10, wherein the projection is configured as one of a spring element and a barb.

13. The arrangement according to claim 1, wherein the blade receptacle includes at least one of a housing and an insulation shell that defines the holding mechanism.

14. The arrangement according to claim 1, wherein the blade receptacle is configured to be moved onto the at least one electric contact, and wherein the holding mechanism is elastically deformed when the blade receptacle is first moved onto the at least one electric contact and prior to the holding mechanism engaging into the receiving feature.

15. The arrangement according to claim 1, wherein the at least one electric contact includes a connecting section with a flat configuration and two side sections spaced apart from one another and extending perpendicularly from the connecting section such that the at least one electric contact has a U-shaped profile, the connecting section defining the receiving feature.

16. The arrangement according to claim 15, wherein:
   the connecting section fixes the blade receptacle in a second spatial direction lying in a plane,
   the side sections fix the blade receptacle in a third spatial direction lying in the plane, and
   the first spatial direction is perpendicular with respect to the plane.

17. The arrangement according to claim 1, wherein the housing component is a printed circuit board.

18. The arrangement according to claim 1, wherein the blade receptacle is electrically connected to the housing component with a cable or a wire.

* * * * *